United States Patent [19]

DiStefano et al.

[11] Patent Number: 4,684,547

[45] Date of Patent: Aug. 4, 1987

[54] FORMAT PATTERNING METHOD FOR MAGNETIC RECORDING MEDIA

[75] Inventors: Thomas H. DiStefano, Bronxville; Ralph L. Hollis, Jr., Yorktown Heights, both of N.Y.; Mark Johnson, Hamburg, Fed. Rep. of Germany; Sherman S. Wang, Los Altos Hills, Calif.

[73] Assignee: International Business Machines Corporation, Armonk, N.Y.

[21] Appl. No.: 814,349

[22] Filed: Dec. 27, 1985

[51] Int. Cl.$^4$ ............................................. H01F 10/00
[52] U.S. Cl. ...................................... 427/131; 101/34; 101/426; 156/632; 427/132; 427/261; 428/694; 428/900; 428/928
[58] Field of Search .................. 427/131, 132, 261, 38, 427/290, 296; 428/900, 694; 101/34, 426; 156/630, 632

[56] References Cited

PUBLICATIONS

Sadagopan et al, High-Density Bubble Domain Shift Regular, pp. 215-219, A. P. Conf. Proc., No. 5, 12-81.

*Primary Examiner*—Bernard D. Pianalto
*Attorney, Agent, or Firm*—Alexander Tognino

[57] ABSTRACT

A method and apparatus for format patterning magnetic recording media with servo-control patterns is disclosed herein. The method comprises the steps of printing the control pattern using a resist in liquid form onto the media material by conventional printing techniques. A layer of a thin metallic film is then deposited over the resist and uncovered substrate areas. The resist and its overlayered metal is then removed using a liftoff technique by dissolving the resist in its particular solvent. A control pattern of deposited metallic film remains in those non-resist areas. In the alternative, the process can also use an etching bath to create the servo control pattern.

12 Claims, 7 Drawing Figures

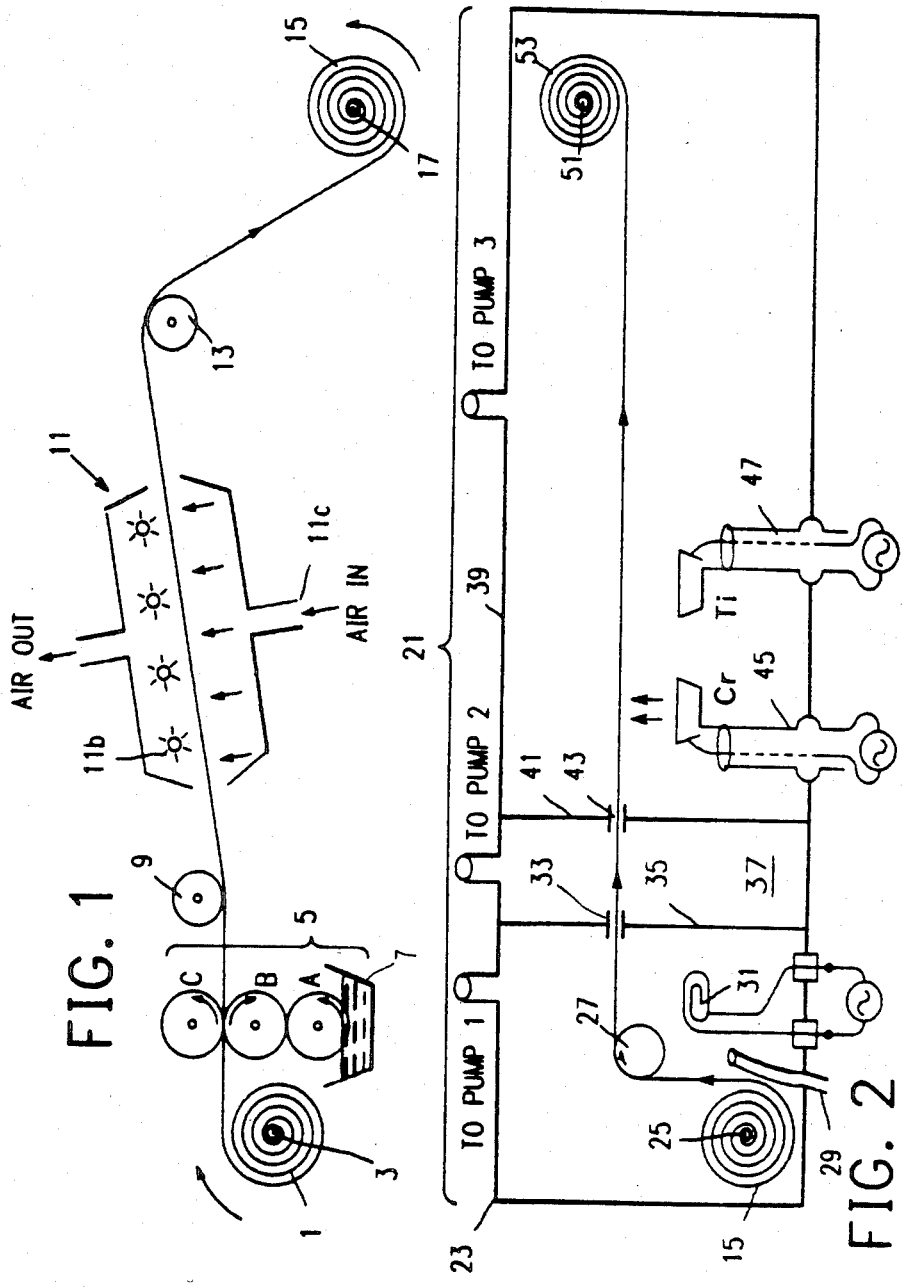

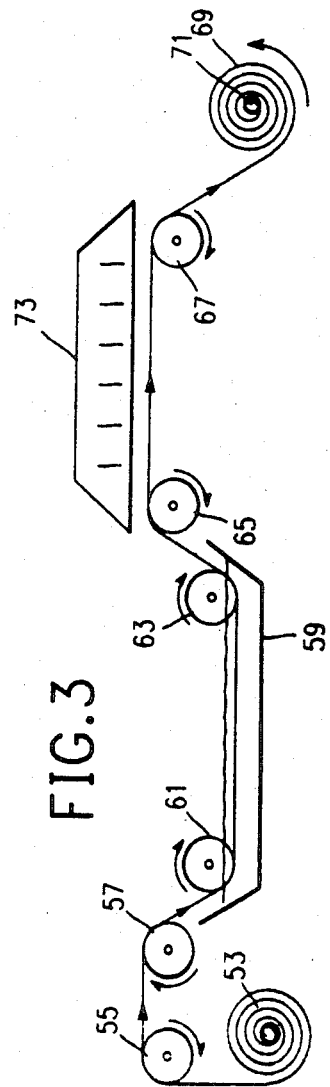
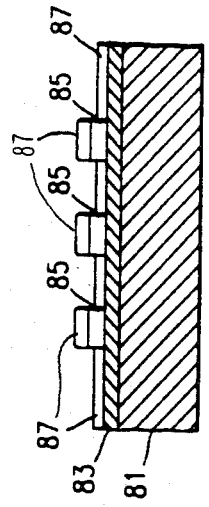
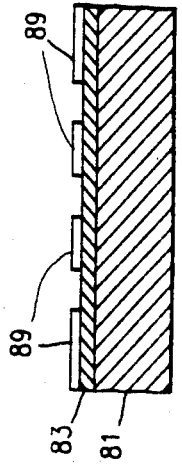
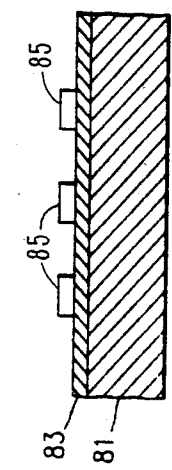

FORMAT PATTERNING METHOD FOR MAGNETIC RECORDING MEDIA

BACKGROUND OF THE INVENTION

1. Field of the Invention

The present invention reltes to a method for patterning data storage media with optical or capacitive servo control patterns on the surface of said storage media.

2. Description of Related Art

Servo control systems for magnetic recording drives require control patterns on the disks or tape units for dynamically positioning the read/write head. The control patterns must be built into the units in such a way that they are compatible with the magnetic recording medium employed and re easily sensed by the read/write head. Ideally, the control pattern does not interact with readout of the magnetically recorded signal.

One technique, which has been used by those working in this field, has been to directly incorporate with the data stored, the positioning information for the servo system. However, this system has been less than desirable, as the servo positioning information takes up valuable data storage space, and interferes with readout of the recorded data.

In response to this demand for a more data efficient method of incorporating servo control patterns with the data to be recorded, several alternative techniques have been developed.

For example, in IBM Technical Disclosure Bulletin, Volume 21, No. 1, pp. 4259–4260, (March 1979), Acosta et al teach embossing servo control tracks on a magnetic recording disk. The magnetic recording medium is taught as being made in the usual manner, followed by the stamping or embossing of said medium with a master die. In another attempt at incorporating servo control patterns on the recording media Kojima et al in U.S. Pat. No. 4,150,398, describe the optical formation of a disk recording by exposing a film of photoresist with a laser to produce grooves with irregularities at the bottom of the grooves, However, both of these systems have failed to yield a sufficiently accurate and sensitive mechanism by which the data file on the magnetic disk can be managed.

In a copending U.S. patent application Ser. No. 613,943 filed May 24, 1984 of Best et al, the formation of a data recording medium is described for carrying a data recording layer (e.g., magnetic or optical) with a thin metal servo control track layer located either above or below said recording layer. The thickness of the metal layer can be varied to provide a variable electromagnetic property, such as variable capacitance, to indicate position. While the application teaches how to embody the thin metal layer with a recording media, the application does not disclose a method of continuous format patterning the servo control layer on a recording medium.

It is therefore, an object of the present invention to develop a simple and efficient method for patterning thin metal servo control film patterns on magnetic recording media in a continuous manner.

It is another object of this invention to provide servo control patterns that do not interact or interfere with readout of the magnetically recorded information.

SUMMARY OF THE INVENTION

The process of this invention is for a method of manufacturing magnetic recording disks (either floppy or rigid) with servo control patterns, located, either, above or below the surface of the magnetic recording media. The control patterns can be detected by optical or capacitive sensors and are applied as a thin film layer composed of metal or the like.

The method comprises the printing of a pattern on a medium in a resist material by means of mechanical printing. Examples of printing mechanisms capable of being used with this invention include standard offset printing, transfer printing, ink jet printing, or gravure printing in a resist medium (such as gelatin or water soluble acrylic polymers). Next, a thin layer of metallic film is deposited over the resist pattern. The metallic film layer can be deposited as one layer or as a laminate of an intermediate adhesion layer of a metal such as Ti, Cr, Al, Mn, Mg, Si etc. can be deposisted followed with a second layer of metal of Ti, Sn, Ta, V, Pd, Pt, W, Nb, Al, Cr, Ni or alloys such as CuAg, Cu, Ni, AgPd, TiAl, etc. Metal deposited over resist is removed by a liftoff process and a lubricant layer or other thin organic layer can be added to the surface of the material.

Alternatively, the metal layer can be deposited first and then a resist pattern is printed on the metal by means including offset printing, gravure, printing etc. The unprotected metal is then removed by etching. Wherefore, the resist is removed by a solvent, leaving a metal pattern.

The process of format patterning of a magnetic recording medium using a liftoff technique can be performed as follows:

1. Load a roll of medium into a printer.
2. Print a resist pattern on the medium.
3. Pass the result of step (b) through a drier.
4. Pass the printed medium into a vacuum coating chamber.
5. Clean the printed medium with a plasma.
6. Vacuum deposit an adhesion layer on the dried and cleaned medium.
7. Monitor the coated medium optically.
8. Develop the medium in a solvent for said resist to left off the resist and the metal deposited thereon. Ultrasonic or other agitation may be required to obtain a clear lift-off pattern.
9. Center a punch on the pattern printed on the medium.
10. Punch the medium with the punch to form a disk.
11. The disk can be bonded to a rigid substrate holder to form a high density disk.

The foregoing and other objects, features and advantages of the invention will be apparent from the following more particular description of the invention as illustrated in the accompanying drawings.

BRIEF DESCRIPTION OF THE DRAWINGS

FIG. 1 is a diagram for printing the resist pattern onto a roll of the magnetic media.

FIG. 2 is a diagram for the surface preparation, metal layer deposition and lubrication of the patterned material from FIG. 1.

FIG. 3 is a diagram of the liftoff process as used on the roll of metallized media from FIG. 2.

FIG. 4 is a diagram of the cross section of the media as the patterning process is progressed through its various steps.

DETAILAED DESCRIPTION OF THE PREFERRED EMBODIMENT

Optical or capacitive servo control patterns for particulate magnetic media can be formed in a thin metallic layer coating on the substrate surface. Metal films such as 300 Å of titanium, have been known to be used and have a high abrasion resistance and optical contrast, without affecting the magnetic properties of the medium. Patterns in such metal films can be read with optical or capacitive transducers to obtain a position error signal which is required for servo positioning of the read/write head. Such thin film servo patterns have been found to be suitable for floppy disk systems, as well as with various types of magnetic film. However, heretofore, only a basic, simple, and inefficient method for format patterning magnetic media with such a thin metal film was known.

The method disclosed, herein, first comprises the printing of a resist pattern on a magnetic media web. This printing is done by either offset printing, gravure printing, ink jet or other similar mechanical printing techniques. Next, a thin metal film is deposited onto said web so that the metal covers both the resist pattern and unprinted upon media. Then, the metal deposited on the resist pattern is removed by a liftoff process leaving the metal directly deposited on the surface of the magnetic medium. This entire process, up to the point at which the disks are punched from the web, is done in a continuous process. While the above process has been described using a liftoff technique, this is not to be considered limiting thereby.

In an alternataive embodiment, the same continuous processing can be performed with an etching technique to yield the thin metal film servo pattern.

When etching is used instead of a liftoff process, the metal layer is deposited first. Following, thereto, the resist pattern is printed on the metal by the printing means as mentioned above. The unprotected metal is then removed by etching and the resist is removed by a solvent, leaving the desired servo pattern. Hereinafter, the invention will be described using a liftoff technique, however, as mentioned above, the invention is equally practicable using an etching technique.

When processing is practiced using a liftoff technique, the basic steps are printing, surface preparation, metal layer deposition, liftoff of excess metal and surface conditioning and lubrication.

FIG. 1 shows a diagrammatic view of the first step of the process for printing the resist pattern onto a roll of magnetic material. In the figure, a feed roll of web material 1 is mounted on roller 3 and fed in a continuous manner through the processor assembly. The web material is a standard floppy disc material that is MYLAR coated on one or both sides with particulate magnetic material impregnated thereon.

From the feed roll, the web material 1 is fed to an offset printer 5. The offset printer 5 includes an inking spool 5a, printing roller 5b, and guide roller 5c. A reservoir 7 provides the offset printer 5 with gelatin for printing. In operation, inking spool 5a rotates through resist reservoir 7 becoming coated with resist thereby. In a continuous manner, roller 5a transfers the resist gelatin to printing roller 5b which contacts the magnetic media for printing the resist servo-pattern on material 1. Roller 5c acts as a feed and pressure plate for roller 5b to print against.

The imprinted magnetic media then passes through drying box 11 in order to harden, but not cross link the gelatin. Drying box 11 provides a heat source 11b and air intake means 11c for proper drying of the resist pattern.

The processed media is then collected in a take-up roll 15 on roller 17. Rollers 9 and 13 are idler rollers which allow for proper feeding of the magnetic medium without unnecessary tensioning and resultant stretching.

It should be appreciated by those skilled in the art that it would also be possible to follow the process step of FIG. 1 using various other types of printing configurations. For instance, the resist patterns could be applied by contact printing onto the photoresist with removal of any excess or by projection printing onto the photoresist with development, or by jet printing etc. Moreover, it should also be appreciated that many different types of resist are capable of being printed with, including but not limited to: gelatin, water soluble acrylic polymers, and varnish resists etc.

FIG. 2, shows a diagram of the surface preparation, metal deposition and lubrication for the printed patterned material of FIG. 1. In the figure, the processor apparatus 21 is seen to comprise a three stage process container. All three stages are performed in an in-line vacuum wherein each stage is pumped down by a respective vacuum pump not shown.

In the first stage 23, the roll material from FIG. 1, is mounted on a roller 25 to allow for continuous sheet feed while idler pulley 27 balances the tension on the magnetic material as it is fed. In this first stage 23, the material 17 is surface treated in a RF $O_2$ plasma. Oxygen is fed into the chamber via feed 29, with the plasma atmosphere being created by RF plasma generator 31. This treatment in the $O_2$ plasma removes any surface contamination from the magnetic material surface and increases the potential adhesion of the metal to be deposited.

From chamber 23, the web, then, passes through differential pumping chamber 37 through openings 33 and 43 in the respective chamber walls 35 and 41. From chamber 37, the web 15, then, enters processing chamber 39 where a layer of an adhesion promoter is deposited on the surface of the magnetic material by RF evaporator 45. The adhesion promoting layer is 50 Å thick and can be either titanium, chromium, aluminium, magnesium, manganese, silicon or any similar adhesion promoting metal.

Following, thereto, a thicker layer of metal is deposited on the magnetic material by RF evaporataor 47. The metal of this thicker layer is chosen for its wear and corrosion resistant properties. The layer is about 100-1000 Å thick and can be titanium, tin, varadium, palladium, tungsten, chromium, nickel, etc. or alloys thereof, such as CuAg, CuNi, AgPd, TiAl, etc. An example of the above metal layered structure would be 300 Å of Ti, deposited on 10 Å of Cr. Optionally, an optical reflectivity monitor can be used to control the evaporation of the metal film. The material 53 is finally spooled on roller 51 for removal from the coating process.

FIG. 3 shows a diagram of the liftoff process as used on the metallized medium 53 of the FIG. 2. In the Figure, the roll of metallized medium 53 is fed through idler pulleys 55 and 57 to the solvent developer reservoir 59. As stated above, depending on the resist selected, a suitable solvent is used for the particular resist selected. Herein, with a gelatin resist, hot water is used to liftoff the resist and the overcoated metal wherey the metal pattern deposited on the material remains. Idler rollers 61 and 63 maintain the material 53 submerged in the solvent developer. From the solvent developer 59, the material is, then, passed under drier 73 and spooled on roller 71. Therefrom, the disks are punched from the web by conventional techniques using fiducial marks on the pattern to center the disk. The disk can then be bonded to a rigid substrate to form a rigid recording disk with a servo pattern.

The structure of the medium at the various stages of the process can be seen from the diagrams of the cross section of the medium in FIG. 4. FIG. 4a shows the initial material cross section with the magnetic recording film 83 in a laminate relationship to the MYLAR backing 81. FIG. 4b is a cross section of the product of FIG. 1 where the gelatin resist 85 has been offset printed on the laminate of FIG. 4a. FIG. 4c is a cross section of the product of FIG. 2 where the metallic layer 87 has been deposited onto the material laminate of FIG. 4b. FIG. 4d is cross section of the product of FIG. 3 where the thin metal film pattern 89 has been left exposed on the laminate by the liftoff process.

A specific embodiment of a servo control pattern was formed on flexible media comprising 0.9 mil of chrome doped gamma iron oxide particulate magnetic material on a 1.0 mil PET substrate. A pattern was printed on the surface of the particulate media by a conventional offset press using standard black rubberoid ink. The lines are spaces of the control pattern were 1.0 mil wide. The pattern was air dried for 1 hour after which a 300 Angstroms thick layer of titanium was sputter deposited on the printed surface of the media. The structure was then immersed in xylene for 30 seconds with ultrasonic agitation, to remove the ink and the metal on the ink pattern. The remaining pattern of titanium stripes on the black chrome doped iron oxide material gave a reflectivity modulation of 5% to 45% which was detected by a simple optical detector using laser illumination at 6328 Angstroms. An 8 inch disk was cut from the media, and a servo position control signal was obtained from an optical sensor near the spinning disk.

While the process has been described for format patterning a servo control pattern on a substrate material, it is understood by those skilled in this art that the servo control pattern can either be patterned before or after the depositing of the magnetic recording medium on said substrate. As the pattern utilizes optical or capacitive variances based on thickness, to position the read-/write head, said variations are equally distinguishable above or below the magnetic recording media.

Thus, while the invention has been described with reference to preferred embodiments thereof, it will be understood by those skilled in the art that various changes in form and details may be made without departing from the scope of the invention.

Having thus described out invention, what we claim as new, and desire to secure by Letters Patent is:

1. A method for incorporating data recording servo control patterns onto a continuous sheet of flexible substrate material comprising the steps of:
   (a) passing said material from a supply roll to a printer and printing a pattern of resist onto said material with said printer thereby forming a predetermined pattern of resist on said material and leaving portions of the surface of said substrate material exposed,
   (b) next continuously depositing a thin film of a metal onto said pattern of resist material and the exposed surfaces of said substrate material, and, then,
   (c) removing said resist material from said substrate material thereby lifting off the portion of said metal which had been deposited onto said resist material whereby the metal remaining on said substrate forms the servo-control pattern for locating a recording transducer over a data recording medium.

2. A method in accordance with claim 1 wherein said supply roll substrate material further includes a layer of magnetic recording medium.

3. A method in accordance with claim 2 wherein, after liftoff, the patterned substrate is
   (a) then cut to form at least one disk, and
   (b) said disk is bonded to a rigid substrate, whereby a rigid recording disk with a servo pattern is provided.

4. A method in accordance with claim 2 wherein said printing is mechanical printing employing means selected from offset printing, gravure, and transfer printing.

5. A method in accordance with claim 2 wherein said printing is provided by means of an ink jet printer.

6. A method in accordance with claim 1 further comprising: depositing onto said printed servo pattern a layer of a magnetic recording medium.

7. A method in accordance with claim 6 wherein said printing is mechanical printing employing means selected from offset printing, gravure, and transfer printing.

8. A method in accordance with claim 6 wherein said printing is provided by means of an ink jet printer.

9. A method in accordance with claim 1 wherein said thin film of metal comprises a first and second layer of metal such that said first layer is an intermediate adhesion layer of a metal selected from the group consisting of Ti, Cr, Al, Mn, Mg and Si.

10. A method in accordance with claim 9 wherein said second layer of metal is selected from the group of metals consisting of Ti, Sn, Ta, V, Pd, Pt, W, Nb, Al, Cr, Ni and alloys CuAg, CuNi, AgPd, and TiAl.

11. A process of format patterning a magnetic recording medium with servo-control patterns for locating a recording transducer over said recording medium comprising:
   (a) loading a roll of said medium into a mechanical printer,
   (b) applying a resist pattern to said medium by said printer,
   (c) passing the result of step (b) through a drier,
   (d) passing said printer medium into a vacuum coating chamber,
   (e) plasma cleaning said printed medium,
   (f) vacuum depositing an adhesion layer on said cleaned medium,
   (g) vacuum depositing a thin layer of metal or alloy of thickness 100-1000 Angstroms on said medium,
   (h) developing said medium in a solvent developer for said resist to lift off said resist and the metal deposited thereon whereby the metal remaining on said recording medium forms the servo-control pattern for locating a recording transducer over said recording medium,
   (i) centering a punch on said medium, and
   (j) punching said medium with said punch to form a disk.

12. A method for incorporating data recording servo control patterns on a continuous sheet of flexible substrate material wherein said substrate material has deposited, thereon, the recording medium comprising the steps of:

(a) continuously depositing a thin film of a patterning metal onto said top layer of said substrate material, (b) passing said metallized material to a printer and printing a resist onto said metallized material with said printer thereby forming a predetermined pattern of resist on said material, leaving portions of said metallized material exposed, (c) removing said unprotected metallized material by etching, and (d) removing said resist from said remaining metallized material by dissolving said resist in a suitable solvent, leaving a metal pattern on said substrate whereby the metal remaining on said substrate forms the servo-control pattern for locating a recording transducer over said recording medium.

* * * * *